Figure 1:
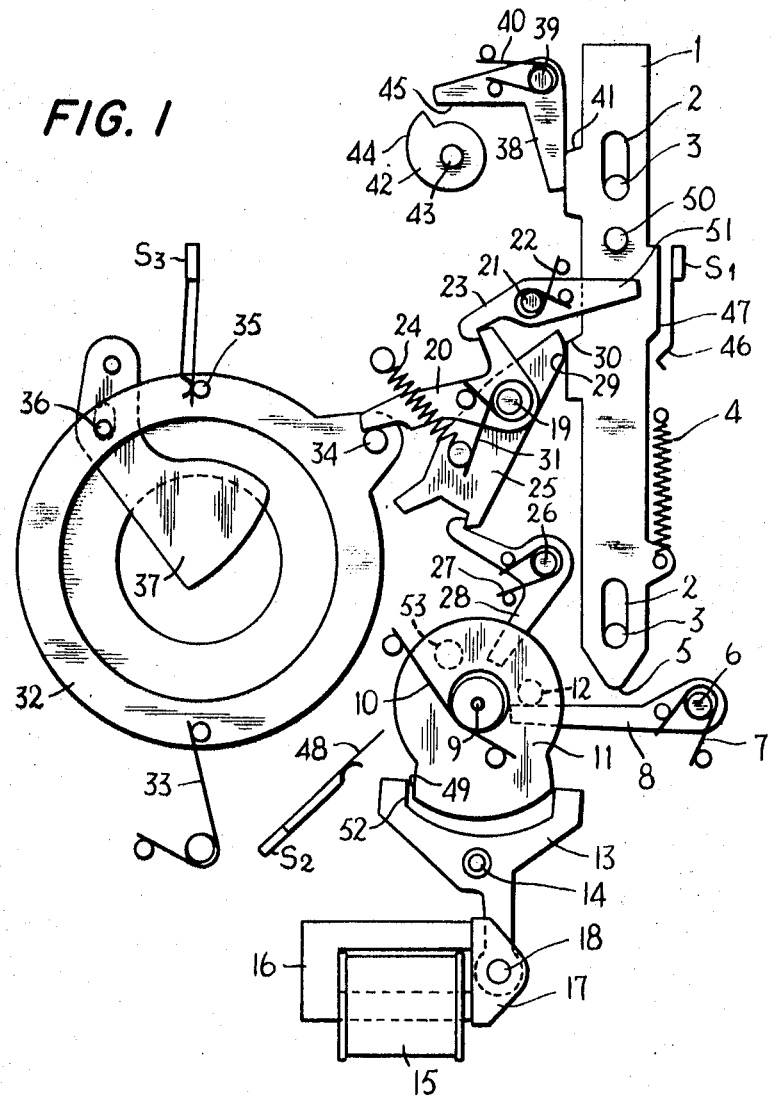

United States Patent

[11] 3,611,900

| [72] | Inventor | Kiyoshi Kitai<br>Tokyo, Japan |
|---|---|---|
| [21] | Appl. No. | 787,727 |
| [22] | Filed | Dec. 30, 1968 |
| [45] | Patented | Oct. 12, 1971 |
| [73] | Assignee | Kabushiki Kaisha Hattori Tokeiten<br>Tokyo, Japan |
| [32] | Priority | Apr. 3, 1968 |
| [33] | | Japan |
| [31] | | 43/21475 |

[54] SWITCH MEANS FOR ELECTRIC SHUTTER
4 Claims, 2 Drawing Figs.

[52] U.S. Cl. .................................................. 95/31 EL,
95/10 C, 95/31 FL, 95/53 EB
[51] Int. Cl. ...................................................... G03b 9/04,
G03b 7/08
[50] Field of Search ..............................................95/53, 53.3,
53.6, 11, 11.5, 31

[56] References Cited
UNITED STATES PATENTS

| 2,978,970 | 4/1961 | Fahlenberg .................. | 95/53.3 X |
| 3,496,852 | 2/1970 | Rittman ........................ | 95/53.3 |
| 3,489,070 | 1/1970 | Fauth ........................... | 95/31 |
| 2,971,446 | 2/1961 | Noack et al. ................. | 95/53.6 |
| 3,482,497 | 12/1969 | Ernisse ....................... | 95/53 |
| 3,187,653 | 6/1965 | Rentschler .................. | 95/53.3 X |
| 3,336,850 | 7/1967 | Otani et al. .................. | 95/53 X |

*Primary Examiner*—Samuel S. Matthews
*Assistant Examiner*—Russell E. Adams, Jr.
*Attorneys*—Robert E. Burns and Emmanuel J. Lobato ABSTRACT: A timing circuit disconnect apparatus in a camera utilizing a timing circuit for operating the camera shutter and an electrical energy source for supplying electrical energy for the timing circuit, the disconnect apparatus including a switch connected in series between the timing circuit and the electrical energy source, which switch is opened at the termination of the shutter operation, and held open until a film winding mechanism is actuated. The disconnect apparatus includes a locking lever selectively engageable with a movable release arm that is connected to the film winding mechanism, the locking lever being arranged to lock the trigger lever in its actuated mode until the winding means is actuated to move the release arm, which in turn moves the locking lever to unlock the trigger lever and release the trigger lever from its actuated mode.

PATENTED OCT 12 1971   3,611,900

SWITCH MEANS FOR ELECTRIC SHUTTER

The present invention relates to a camera that utilizes a timing circuit and an electrical energy source therefore for operating the camera shutter. In such a camera, when the trigger lever is depressed a mechanical train is put into operation to open the shutter and an electrical switch is closed to energize the timing circuit which thereupon controls the length of the time that the shutter is opened. When the shutter is once again closed at the termination of the time determined by the timing circuit, the trigger lever may be actuated to once again operate the shutter mechanism.

In a camera of the kind outlined above, it often happens that the trigger lever is accidentally depressed when, for example, the camera is brought into contact with an object that brushes against the trigger lever and depresses it while the operator is carrying the camera or when he lays it down. In such a case, the timing circuit would be connected to the energy source, i.e., a battery, would be drained of its energy during the time that the switch is closed. If, in such a case, the operator did not notice that the trigger lever was depressed the energy source would continue to be drained until the full supply of its energy was depleted. In some cameras, the circuitry also includes a warning lamp which is actuated in the first stage of a operation of the trigger lever which again would drain the energy source should the trigger lever be accidentally operated.

It is, therefore, an object of the present invention to provide in a camera that utilizes a shutter timing circuit and an electrical energy source therefore, apparatus for disconnecting the electrical energy source from the circuit until such time as the operator wishes to take a photograph.

It is another object of the present invention to provide improved apparatus in a camera that utilizes electrical circuitry and a self-contained electrical energy source therefor, for preventing the electrical energy source from being drained when the camera is not being utilizes to take a photograph.

It is still another object of the present invention to provide in a camera utilizing electrical circuitry and a self-contained electrical energy source therefore, apparatus for maintaining a switch connected in series between the electrical source and the circuitry in an open position, after the shutter has been operated, until the film winding mechanism for the camera is operated.

It is a further object of the present invention to provide, in a camera utilizing electrical circuitry and a self-contained electrical energy source therefore, improved apparatus for preventing the undesired drainage of the electrical energy source when the trigger lever for the camera is accidentally pushed.

Figure 2:
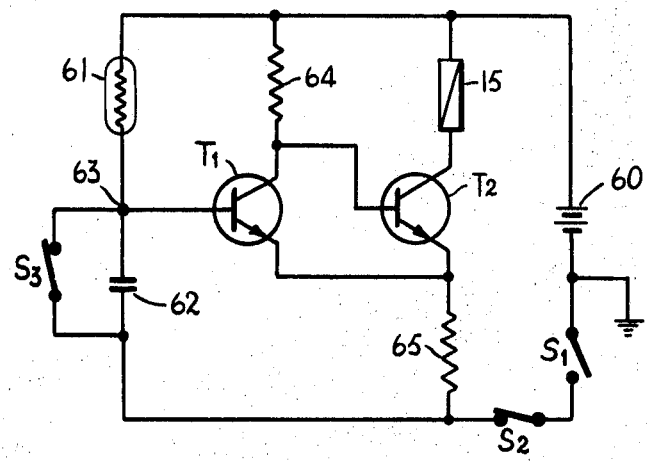

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings in which:

FIG. 1 is a diagrammatic illustration of the apparatus of the present invention; and FIG. 2 is a diagrammatic illustration of the timing circuit utilized by the apparatus shown in FIG. 1.

A DESCRIPTION OF THE PREFERRED EMBODIMENT

In the drawings, FIG. 1 diagrammatically illustrates the elements necessary for an understanding of the present invention and the manner in which they cooperate to perform the functions desired. Thus, a manually operated trigger lever 1 is elongated and includes a pair of elongated guide apertures 2 located one near each end section of the lever. Each of the apertures 2 receives a fixed guide pin 3 which cooperates with the apertures to provide a path of predetermined length along which the lever may be moved endwise when the operator depresses a button mounted on the upper (FIG. 1) end section of the lever 1. The lower end of the trigger lever 1 is narrowed to a contact surface 5 while a coil spring 4 is secured at one end to a fixed pin and at the other end to a pin connected to an integrally formed extension of the lever 1, thereby to bias the lever 1 endwise in a direction opposite from that in which the pointed contact surface 5 is directed.

An elongated lever 8 is pivotally mounted on one end section of a fixed shaft 6 and is aligned with, but spaced from, the contact surface 5 of the trigger lever 1, when the trigger lever 1 is in its nonactuated or retracted position. The elongated lever 8 is biased in a clockwise (FIG.1) direction by a spring 7 mounted about the shaft 6 and having free ends one of which contacts a pin on the lever 8 and the other one of which contacts a fixed pin. A type of an escapement mechanism includes a substantially Y-shaped pawl 13 that is pivotally mounted on a fixed shaft 14 substantially at the juncture of the arms of the pawl. The lower or support leg of the Y-shaped pawl is pivotally mounted by its free end section to a shaft 18, that is connected to armature 17 in turn connected to the iron core 16 of an electromagnet 15. The escapement mechanism also includes a substantially disc-shaped cam plate 11 including a tail section that fits between the upper legs of the Y-shaped pawl 13. Mounted on a first surface of the cam plate 11 is a pin 12 which extends outwardly therefrom and in the path of the free end section of the elongated lever 8. The cam plate 11 is pivotally mounted on a shaft 9 about which a spring 10 is mounted, the spring 10 having two free ends one of which contacts a pin mounted on the tail portion of the cam 11 and the other of which contacts a fixed pin, to bias the cam plate in a clockwise (FIG. 1) direction.

A substantially L-shaped ring actuating lever 20 is pivotally mounted substantially at the junction of its legs on a fixed shaft 19. One free end of the L-shaped lever 20 is adapted selectively to engage the hooked end of an elongated hook lever 23, that is pivotally mounted on a fixed shaft 21. A spring 22 is mounted about the shaft 21 and includes two free ends one of which contacts a pin secured to the lever 23, the other end of which contacts a fixed pin to rotate the lever 23, about the shaft 21 in a counter clockwise (FIG. 1) direction. Also pivotally mounted on the fixed shaft 19 is an elongated closing lever 25 including a contact end section 29 formed at one free end section of the closing lever 25, the other free end of which includes two spaced fingers, one of which is selectively engageable with a hooked end section of one leg of a substantially L-shaped hook lever 28 that is pivotally mounted on a fixed shaft 26. A coil spring 24 is connected at one end to a fixed pin and at the other end to a pin that is connected to the closing lever 25 to urge said closing lever is a clockwise (FIG. 1) direction, and a spring 27 is mounted about the fixed shaft 26 and includes two free end sections, one of which engages a pin on one leg of the L-shaped hook lever 28, the other end section of which engages a fixed pin, to urge said hook lever 28 in a clockwise (FIG. 1) direction. With the trigger lever 1 in its retracted position as shown in FIG. 1 a tab 30 integrally formed with and extending away from the lever 1 is engaged by the contact end section 29 of the closing lever 25, thereby maintaining the lever 25 in its most counterclockwise position and urging the other leg of the L-shaped lever 20 into engagement with a pin 34 mounted on a ring 32 under the force of the spring 31 which is mounted about the shaft 19 and includes two free end sections, one of which engages a pin on the closing lever 25 and the other end of which engages a pin on the L-shaped lever 20. Under these circumstances described immediately above, the L-shaped lever 20 is urged in a counter clockwise (FIG. 1) direction about the shaft 19. The ring 32 is urged in a counterclockwise direction by a spring 33 which is mounted about a fixed shaft and includes two free end sections, one of which engages a fixed pin and the other end of which engages a pin connected to the ring 32. Also mounted on and extending outwardly away from the ring 32 is a switch pin 35 spaced from the pin 34 and a shutter pin 36 spaced from the switch pin 35, switch pin 35 being positioned between the pins 34 and 36. The switch pin 35 is located in the path of an electrical timing switch S3 and the shutter pin 36 protrudes through an elongated aperture formed in one sector blade 37 of a plurality of sector blades as are utilized in a conventional shutter.

A substantially L-shaped locking lever 38 is pivotally mounted on a fixed shaft 39 and a spring 40 is mounted about the shaft 39 and includes two free end sections, one of which contacts a fixed pin and the other of which contacts a pin connected to an unlocking leg of the lever 38 to urge the lever 38 in a counterclockwise direction to bring the other or locking leg of the lever 38 into engagement with a tab, having a locking surface 41, integrally formed with and extending outwardly away from the same side of the trigger lever 1 as that of the tab 30, the tabs being spaced from each other longitudinally of the trigger lever 1. A release cam or arm 42 is mounted upon a shaft 43 that is part of a conventional film winding mechanism (not shown in the drawings) commonly utilized by a camera to bring successive portions of the film into proper position each time that it is desired to take a photograph. The release cam 42 is substantially disc-shaped but it includes a wing portion 44 that extends radially of the main body of the substantially disc-shaped cam 42 which wing portion 44 is brought into engagement with a surface 45 of the locking arm of the L-shaped locking lever 38 when the cam 42 is rotated in a counterclockwise direction as the film mechanism is would to advance the film to the next station. A switch contacting surface 47 of a tab is integrally formed with and extends outwardly from the side of the trigger lever 1 that is oppositely disposed from the side of the trigger lever upon which is formed the other two of the aforementioned tabs, the switch contacting surface being spaced from but aligned with a contact arm 46 of an electrical switch $S_1$ when the trigger lever 1 is in its retracted or raised (FIG. 1) position. A safety switch $S_2$ includes a contact arm 48 which is spaced from but aligned with a switch contacting surface 49 formed on one side of the tail portion of the cam plate 11. Additionally connected to and extending outwardly away from one face of the locking surface 41 on the upper (FIG. 1) half of the trigger lever 1 that is closest to the operator actuating end is a pin 50. The pin 50 is spaced from but aligned with a contact arm 51 of the hook lever 23 with the trigger lever 1 in its retracted position.

Referring now to the electrical circuit shown in FIG. 2, there is shown a battery or self-contained electrical energy source 60 across which is connected the timing circuit utilized by the camera described in the present disclosure. The switches $S_1$ and $S_2$ are connected in series to the negative side of the battery 60 which is connected through the switches to one side of a resistor 65, the other side of which is connected to the emitters of two transistors $T_1$ and $T_2$. The base of the transistor $T_1$ is connected to the negative side of the battery 60 through switch $S_3$ and condenser 62 which are connected in parallel, the base of the transistor $T_1$ also being connected to one side of a photoconductive element 61, the other side of which is connected to the positive side of the battery 60. The positive side of the battery 60 is also connected through a resistor 64 to the collector of the transistor $T_1$ which in turn is connected to the base of the transistor $T_2$. The collector of the transistor $T_2$ is also connected to the positive side of the battery 60 through the electromagnet 15. The point 63 indicated in the drawing denotes the juncture connecting the negative side of the photoconductive element 61, the base of the transistor $T_1$ and the negative side of the condenser $T_2$ and one side of the switch $S_3$.

With the apparatus and circuitry positioned and connected as shown in FIGS. 1 and 2, when the trigger lever 1 is pressed downwardly against the tension of the spring 4, the switch contacting surface 47 is brought into engagement with the contact arm 46 of the switch $S_1$, thereby closing the switch and completing the circuit shown in FIG. 2. Since the timing switch $S_3$ is already closed the voltage applied to the base of the transistor $T_1$ is lower than that of the voltage of its emitter thereby preventing the transistor $T_1$ from conducting, however at this point the voltage applied to the base of the transistor $T_2$ is sufficiently high to cause the transistor $T_2$ to conduct. As the transistor $T_2$ conducts, current is drawn through the coil of the electromagnet 15, and the electromagnet attracts the armature 17 to hold the lever 13 in the position shown in FIG. 1. As the trigger lever 1 is depressed, the contact surface 5 thereof engages the elongated lever 8 to pivot the lever 8 downwardly or in a counterclockwise direction (FIG. 1) so that the free end section of the lever 8 is moved away from the pin 12. Since the pin 12 is connected to the cam plate 11 and the cam plate 11 is biased in a clockwise direction by the spring 10, the cam 11 tends to rotate in a clockwise direction following the free end of the lever arm 8 until the switch contacting surface 49 of the tail end of the cam 11 engages a stop surface 52 of one of the upper of the arms of the Y-shaped pawl 13. As the trigger lever 1 is further depressed, the pin 50 connected to the trigger lever 1 engages the contact arm 51 of the hook lever 23, thereby pivoting the hook lever 23 in a clockwise direction (FIG. 1) about the shaft 21 thereby releasing the hook end of the lever 23 from the L-shaped lever 20. The L-shaped lever 20 thereupon rotates in a counterclockwise direction due to the bias exerted by the spring 31 thereby rotating the ring 32 in a clockwise direction through the pin 34. At this point, the trigger lever 1 has been depressed sufficiently far for the free end of the locking arm of the L-shaped locking lever 38 to have cleared the tab with which it is in contact to bring the free end into engagement with the locking surface 41 as the locking lever 38 is pivoted in a counterclockwise direction by the bias exerted by the spring 40. Thus, it can be understood that the locking lever 38 at this point prevents the trigger lever 1 from returning to its initial position to which it is urged by the bias exerted by the spring 4, even after the operator releases the trigger lever 1.

As the ring 32 is rotated in the clockwise direction, the pin 35 draws away from the switch $S_3$ thereby opening the switch $S_3$ and simultaneously pivoting the sector blade 37 to open the shutter and begin the exposure of the film. When the switch $S_3$ is opened, the condenser 62 begins to charge due to the current drawn through the photoconductive element 61, thereby raising the voltage applied to the base of the transistor $T_1$. It is noted that the photoconductive element 61 is conventional and is constructed of materials whose electrical resistivity varies depending upon the intensity of the light which impinges upon the surface of the materials utilized. When the voltage at the base of the transistor $T_1$ rises to a certain predetermined value, the transistor $T_1$ conducts thereby lowering the voltage at its collector which in turn lowers the voltage applied to the base of the transistor $T_2$, thereby making the transistor $T_2$ nonconductive. When the transistor $T_2$ stops conducting, current is no longer drawn through the coil of the electromagnet 15 and the electromagnet no longer retains the armature 17 in a fixed position so that the cam plate 11 may now push pass the stop surface 52 of the Y-shaped pawl 13 which is now free to pivot about the shaft 14. As the cam plate 11 is further urged in a clockwise direction by the spring 10, the switch contacting surface 49 is brought into engagement with the contact arm 48 of the switch $S_2$, thereby opening the switch $S_2$. Simultaneously, as the cam plate 11 is rotated in the clockwise direction, a pin 53 connected to a face of the cam plate 11 is brought into engagement with one leg of the substantially L-shaped hook lever 28, thereby urging that lever in a counterclockwise direction to free the hook portion of the other leg of the lever 28 from engagement with the closing lever 25. With the closing lever 25 now free to rotate in a clockwise direction through the bias exerted by the spring 24, the closing lever 25 is rotated so that a leg thereof is brought into engagement with the pin 34, thereby rotating the ring 32 in a counterclockwise direction for simultaneously closing the switch $S_3$ and pivoting the sector blade 37 back to its original position to close the shutter.

With the trigger lever 1 now locked in the downward (FIG. 1) or actuated position by the L-shaped locking lever 38 and the switch $S_2$ open, even though the switches $S_1$ and $S_3$ are closed the circuit remains disconnected and no energy may be drained from the battery 60. Further depression of the trigger lever 1 has no effect on the electrical circuit. It is noted that with the trigger lever 1 in its depressed position the operator is alerted to the fact that the winding mechanism has not been wound to place the film in position for taking the next photograph.

When the operator wishes to place the circuit in condition for taking the next photograph, he need merely actuate the film winding mechanism which in turn rotates the shaft 43 in a counterclockwise direction to bring the wing portion 44 of the release cam 42 into engagement with the release surface 45 of the unlocking arm of the L-shaped locking lever 38. As the wing portion 44 engages the surface 45, the locking lever 38 is pivoted in a clockwise direction about the shaft 39, thereby pulling the locking arm away from the locking surface 41 and freeing the trigger lever 1 from locking engagement with the lever 38. At this point the trigger lever 1 is moved endwise back to its original position by the spring 4 returning thereby all of the previously described elements back to their original position as shown in FIG. 1. Thus, the contact end section 29 of the closing lever 25 is pushed outwardly away from the trigger lever 1 by the tab 30 to rotate the closing lever 25 in a counterclockwise direction against the force of the springs 24, 31 to once again bring the lever 25 into locking engagement with the hook portion of the hook lever 28. Also, the L-shaped lever 20 which has been rotated in a clockwise direction by the counterclockwise movement of the ring 32 is brought back into locking engagement with the hook portion of the elongated hook lever 23. Further, since the elongated lever 8 is now free of engagement with the contact surface 5 of the trigger lever 1, it is pivoted in a clockwise direction by the spring 7 into engagement with the pin 12, thereby to rotate the cam plate 11 counterclockwise back to the position shown in FIG. 1.

Numerous alterations of the structure herein disclosed will occur to those skilled in the art. However, it is to be understood that the present disclosure relates to a preferred embodiment of my invention which is for purposes of illustration only and not to be construed as a limitation of the invention. All such modifications which do not depart from the spirit of the invention are intended to be included within the scope of the appended claims.

What I claim and desire to secure by Letters Patent is:

1. In a camera having a shutter and electrical circuitry for controlling the operation of the camera shutter, film winding means, a self-contained electrical energy source, a timing circuit energized by said electrical energy source, means for actuating the camera shutter including a manually operable trigger lever, means operable by said manually operable trigger lever for opening said shutter, means including said timing circuit for closing said shutter, and means for preventing said energization of said timing circuit before said film winding means is actuated preparatory to actuating the camera shutter, the improvement wherein said means for preventing said energization of said timing circuit comprises; a switch connected in series between said timing circuit and said electrical energy source, and mechanical means for engaging and opening said switch upon said closing of said shutter, said mechanical means including means for holding said switch open until said film winding means is actuated, and having a switch contact arm, spring biased movable cam means selectively engageable with said switch contact arm for moving said arm to open said switch, means for holding said cam away from engagement with said switch contact arm, and means coupled to said trigger lever for releasing said cam holding means to allow said cam to engage said switch contact arm to open said switch when said trigger lever is manually operated.

2. In a camera having a shutter and electrical circuitry for controlling the operation of the camera shutter, film winding means, a self-contained electrical energy source, a timing circuit energized by said electrical energy source, means for actuating the camera shutter including a manually operable trigger lever, means operable by said manually operable trigger lever for opening said shutter, means including said timing circuit for closing said shutter, and means for preventing said energization of said timing circuit before said film winding means is actuated preparatory to actuating the camera shutter, the improvement wherein said means for preventing said energization of said timing circuit comprises a switch connected in series between said timing circuit and said electrical energy source, and mechanical means for engaging and opening said switch upon said closing of said shutter, said mechanical means including means for holding said switch open until said film winding means is actuated and having an electromagnetically controlled pawl means, connected to said timing circuit for energization and deenergization, respectively, in response to opening and closing of said shutter, and movable cam means controlled by said pawl means, said movable cam means being arranged to open said switch after said cam means is released by said pawl means in response to the closing of said shutter.

3. In a photographic camera including a shutter, trigger means for movement from a set position to an actuated position to initiate an exposure by opening said shutter, an electric delay circuit for controlling the exposure period, a power source for energizing said electric delay circuit, and a film winding mechanism, the improvement comprising: first and second switch means connected in series between said electric delay circuit and power source, means coupled to said trigger means for closing said first switch means in response to said movement of said trigger means to said actuated position, exposure terminating means responsive to said electric delay circuit for closing said shutter, means coupled to said exposure terminating means for opening said second switch means in response to an exposure termination, locking means for releasably holding said trigger means in said actuated position to maintain said first switch means in said closed condition, releasing means coupled to said film winding mechanism for releasing said locking means, and means for returning said trigger means from said actuated position to said set position.

4. A photographic camera as set forth in claim 3, in which said exposure terminating means includes an electromagnet having a coil connected to said electric delay circuit, and switch closing means rotatably mounted adjacent said electromagnet for movement thereby to open said second switch.